United States Patent
Nakatani

(10) Patent No.: US 7,830,762 B2
(45) Date of Patent: Nov. 9, 2010

(54) OPTICAL DISK APPARATUS

(75) Inventor: Morio Nakatani, Ichinomiya (JP)

(73) Assignee: Sanyo Electric Co., Ltd., Osaka (JP)

(*) Notice: Subject to any disclaimer, the term of this patent is extended or adjusted under 35 U.S.C. 154(b) by 424 days.

(21) Appl. No.: 11/877,464

(22) Filed: Oct. 23, 2007

(65) Prior Publication Data
US 2008/0259756 A1    Oct. 23, 2008

(30) Foreign Application Priority Data
Oct. 23, 2006    (JP)    ............... 2006-288132

(51) Int. Cl.
G11B 7/00    (2006.01)
(52) U.S. Cl. .................... 369/47.5; 369/53.26; 369/116
(58) Field of Classification Search ..... 369/47.5–47.53, 369/53.26, 116, 59.11, 13.24, 13.26, 13.27
See application file for complete search history.

(56) References Cited

U.S. PATENT DOCUMENTS

2002/0114250 A1* 8/2002 Fujimoto et al. ......... 369/59.22
2004/0017736 A1* 1/2004 Suzuki et al. ............ 369/13.09
2005/0117507 A1* 6/2005 Hwang et al. ............ 369/53.26

FOREIGN PATENT DOCUMENTS

JP    2003-228840    8/2003

* cited by examiner

*Primary Examiner*—Thang V Tran
(74) *Attorney, Agent, or Firm*—Ditthavong, Mori & Steiner, P.C.

(57) ABSTRACT

A laser power which is lower than an optimum reproduction laser power is set as an initial value. The reproduction laser power is increased from the initial value while trial reproduction is performed until a quality level of a reproduction signal is not lower than a reference level. At the time the quality level of the reproduction signal is not lower than the reference level, the reproduction laser power is set as the reproduction laser power with respect to an optical disk which is of a reproduction target.

6 Claims, 8 Drawing Sheets

FIG. 3A

| OPTICAL DISK MANUFACTURING COMPANY | INITIAL VALUE |
|---|---|
| A | Pwa |
| B | Pwb |
| C | Pwc |
| ... | ... |
| DEFAULT VALUE | Pwall |

FIG. 3B

| OPTICAL DISK MANUFACTURING COMPANY | ADJUSTMENT FACTOR OF INITIAL VALUE |
|---|---|
| A | αa |
| B | αb |
| C | αc |
| ... | ... |
| DEFAULT VALUE | αall |

DURING RECORDING OPERATION

DURING REPRODUCTION OPERATION

OPTICAL DISK APPARATUS

This application claims priority under 35 U.S.C. Section 119 of Japanese Patent Application No. 2006-288132 filed Oct. 23, 2006, entitled "OPTICAL DISK APPARATUS".

BACKGROUND OF THE INVENTION

1. Field of the Invention

The present invention relates to an optical disk apparatus, particularly to the optical disk apparatus which is suitably used to reproduce information from a so-called Low-to-High type optical disk in which a reflectance of a recorded portion is higher than that of an unrecorded portion.

2. Description of the Related Art

Currently, HD DVD-R (High Definition Digital Versatile Disc-Recordable) is being prepared for the market. In HD DVD-R, there is proposed a so-called Low-to-High type optical disk in which the reflectance of the recorded portion is higher than the reflectance of the unrecorded portion.

In such optical disks, because a recording layer is made of an organic coloring material, the Low-to-High type optical disk is easily affected by light from the outside compared with a High-to-Low type optical disk in which the recording layer is made of an inorganic material. On the other hand, at least 1000000-time reproductions are demanded in the HD DVD standard. Even in the Low-to-High type optical disk, it is necessary to ensure high reliability for recording information. Therefore, in the optical disk drive apparatus, it is necessary that a laser power be properly set during recording such that degradation of a recording film property and cross erase are not generated due to excessive light irradiation.

FIGS. 8A and 8B schematically show operations when the information is recorded in or reproduced from the Low-to-High type HD DVD-R. As shown in FIGS. 8A and 8b, as with the High-to-Low type HD DVD-R, the recording is performed only to grooves in the Low-to-High type optical disk. Because the optical disk is not rewritable, the recording is sequentially performed to the track one by one from an inner circumference to an outer circumference of the optical disk.

As shown in FIG. 8A, when the recording is finished to a groove (G1), the recording is performed to a groove (G2) adjacent to the groove (G1). In this case, the recorded groove (G1) is partially irradiated with a periphery of a light spot when the recording is performed to the groove (G2). Laser beam intensity in the light spot concentrates on a central portion of the light spot. Therefore, even if the recorded groove (G1) is partially irradiated with the periphery of the light spot, a recording mark is not formed on the groove (G1).

However, at this point, the laser beam leaks slightly into the groove (G1). The leakage of the laser beam affects the recording layer of the groove (G1) to generate the degradation of the recording layer in terms of light stability. Additionally, when the groove is irradiated with the high-power laser beam in the recording operation, the degradation is generated in the recording film property, which possibly results in a problem of reproduction durability.

In the reproduction operation, the optical disk is irradiated with the laser beam having a certain level of laser power lower than that in the recording. This causes the recording layer in the groove to be exposed to deteriorate the recording layer in light resistance. Particularly, an irradiation frequency with the reproduction laser beam is increased in an area, such as a data lead-in area and a file information storage area, which is read in each reproduction and frequently accessed by an optical pickup. Therefore, in the area, the recording layer deterioration is easily generated compared with other areas. However, when the area cannot be reproduced, information necessary to reproduce main information cannot be obtained to disable the information reproduction of the whole optical disk.

SUMMARY OF THE INVENTION

The present invention is made to solve the above problem. According to the invention, the reproduction laser power is properly set to the Low-to-High type optical disk, which suppresses a deterioration of the recording layer characteristic to enhance a reproduction durability of the optical disk and a reliability of the recording information.

An aspect according to the invention provides an optical disk apparatus including an optical pickup which irradiates an optical disk with a laser beam; an optimum reproduction laser power obtaining unit which obtains an optimum reproduction laser power from the optical disk; an initial laser power setting unit which sets a laser power lower than the optimum reproduction laser power as an initial value; a laser power adjusting unit which increases the reproduction laser power from the initial value while performing trial reproduction until a quality level of the reproduction signal is not lower than a reference level; and a reproduction laser power setting unit which set the reproduction laser power at a time the quality level is not lower than the reference level as the reproduction laser power to reproduce the optical disk.

According to the aspect of the invention, the reproduction is performed at the laser power lower than the optimum reproduction laser power obtained from the optical disk. Therefore, the recording layer deterioration caused by the irradiation of the recording layer with the reproduction laser beam is suppressed to enhance the reproduction durability of the optical disk and the reliability of the recording information. Even if the reproduction laser power is set in the above-described manner, a quality level of a reproduction signal is ensured to a reference level or more, so that a smooth reproduction operation can be realized.

Each function of "optimum reproduction laser power obtaining unit", "initial laser power setting unit", "laser power adjusting unit", and "reproduction laser power setting unit" is mainly performed by a controller 111 in the following embodiment. However, the following embodiment is described only by way of example in implementing the invention, and the invention is not limited to the following embodiment.

BRIEF DESCRIPTION OF THE DRAWINGS

The above and other objects and novel features of the invention will become more fully apparent from the following description of embodiments with reference to the accompanying drawings.

FIGS. 3A and 3B shows a configuration of an initial value table according to an embodiment of the invention;

However, the drawings are used for the purpose of illustration only, and the drawings are not intended to restrict the scope of the invention.

DESCRIPTION OF THE PREFERRED EMBODIMENTS

Preferred embodiments of the present invention will be described below with reference to the drawings. In the embodiments, the present invention is applied to an optical disk apparatus in which the recording and reproduction are performed to the Low-to-High type HD DVD-R.

Figure 1:
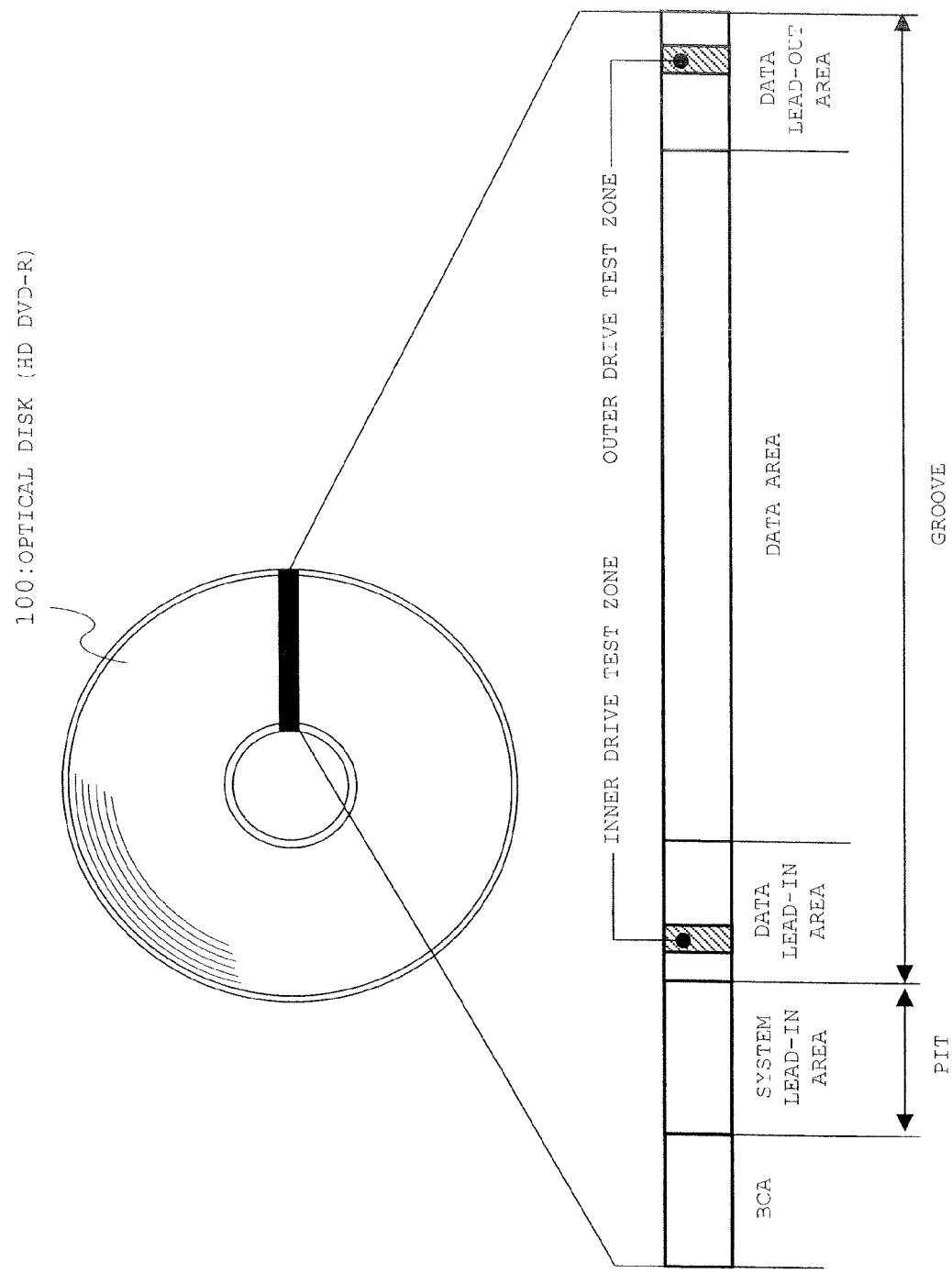
FIG. 1 shows an area format of an optical disk according to an embodiment of the invention.

FIG. 1 shows an area format of an optical disk 100 according to an exemplary embodiment of the present invention.

Referring to FIG. 1, the optical disk 100 is divided in a disk radial direction into BCA (Burst Cutting Area), a system lead-in area, a data lead-in area, a data area, and a data lead-out area. The data lead-in area and the data lead-out area are divided into various zones. A recording laser power setting operation is performed using an inner drive test zone and an outer drive test zone in the zones.

A corresponding written standard number and a disk type are recorded in BCA. In loading the optical disk, the optical disk apparatus can read BCA to detect the disk type. In addition to the corresponding written standard number and the disk type, information on recording and reproduction of the optical disk is recorded in the form of pits in a system lead-in area. The information includes a recording speed adapted to the optical disk, a reflectance, optimum recording and reproduction powers, a write strategy, recording area setting, and identification information on an optical disk manufacturing company. In loading the optical disk, the optical disk apparatus reproduces the system lead-in area to obtain the information necessary for the recording and reproduction in addition to the disk type.

A pit forming area (system lead-in area) and a groove forming area (data lead-in area, data area, and data lead-out area) have the same film structure. That is, as with the groove forming area, a recording film and a reflecting film are formed in the pit forming area.

Figure 2:
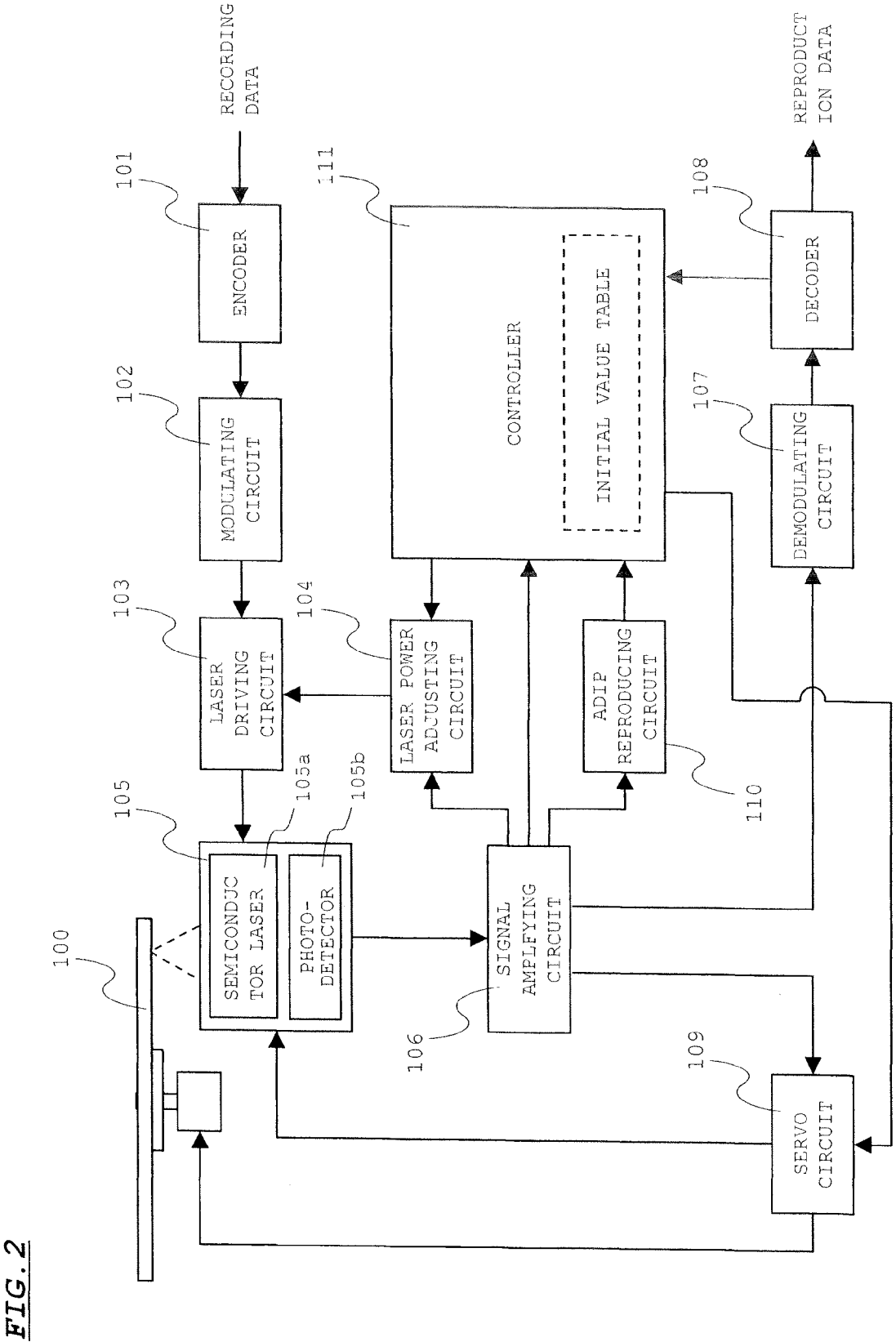
FIG. 2 shows a configuration of optical disk apparatus according to an embodiment of the invention.

FIG. 2 shows a configuration of an optical disk apparatus according to an exemplary embodiment of the present invention.

Referring to FIG. 2, the optical disk apparatus includes an encoder 101, a modulating circuit 102, a laser driving circuit 103, a laser power adjusting circuit 104, an optical pickup 105, a signal amplifying circuit 106, a demodulating circuit 107, a decoder 108, a servo circuit 109, an ADIP reproducing circuit 110, and a controller 111.

An actuator for moving the optical pickup 105 in the disk radial direction is neglected in FIG. 2. The driving of the actuator is controlled by a servo signal inputted from the servo circuit 109. The controller 111 appropriately outputs a command signal to the servo circuit 109 in setting a recording laser power.

In FIG. 2, the encoder 101 performs an encoding process such as addition of an error correction code to the inputted recording data, and the encoder 101 outputs the encoded recording data to the modulating circuit 102. The modulating circuit 102 performs a predetermined modulation to the inputted recording data, and the modulating circuit 102 generates a recording signal and outputs the recording signal to the laser driving circuit 103. The laser driving circuit 103 outputs a driving signal to a semiconductor laser 105a according to the recording signal from the modulating circuit 102 during the recording, and the laser driving circuit 103 outputs a driving signal to the semiconductor laser 105a to emits a laser beam having constant strength during the reproduction. During the recording and reproduction, the laser beam is controlled by a signal from the laser power adjusting circuit 104. The laser power adjusting circuit 104 outputs a signal to the laser driving circuit 103 to regulate the laser powers during the recording and reproduction according to the command from the controller 111.

The optical pickup 105 includes the semiconductor laser 105a and a photodetector 105b. The optical pickup 105 causes the laser beam to converge on the groove to perform the data write and read to the optical disk. The optical pickup 105 also includes an objective lens actuator and an optical system. The objective lens actuator adjusts the state in which the groove is irradiated with the laser beam. The optical system guides the laser beam emitted from the semiconductor laser 105a, and the optical system guides the light reflected from the optical disk 100 to the photodetector 105b.

The signal amplifying circuit 106 amplifies the signal received from the photodetector 105b, the signal amplifying circuit 106 performs a computation process to the signal to generate various signals, and the signal amplifying circuit 106 outputs the signals to corresponding circuits. The demodulating circuit 107 generates reproduction data by demodulating a reproduction RF signal inputted from the signal amplifying circuit 106, and the demodulating circuit 107 outputs the reproduction data to the decoder 108. The decoder 108 performs a decoding process such as error correction to the data inputted from the demodulating circuit 107, and the decoder 108 outputs the decoded data to a subsequent circuit.

The servo circuit 109 generates a focus servo signal and a tracking servo signal from a focus error signal and a tracking error signal which are inputted from the signal amplifying circuit 106, and the servo circuit 109 outputs the focus error signal and tracking error signal to the objective lens actuator in the optical pickup 105. The servo circuit 109 also generates a motor servo signal from a wobble signal inputted from the signal amplifying circuit 106, and the servo circuit 109 outputs the motor servo signal to a disk driving motor. The ADIP reproducing circuit 110 reproduces address information from the wobble signal inputted from the signal amplifying circuit 106, and the ADIP reproducing circuit 110 outputs the address information to the controller 111.

The controller 111 includes CPU (Central Processing Unit) and a built-in memory. The controller 111 stores various kinds of data in the built-in memory, and controls each unit according to a previously set program. Information (initial value table) for setting an initial value of the reproduction laser power is stored in the built-in memory of the controller 111. As shown in FIG. 3A, in the information, an optical disk manufacturing company and the initial value can be correlated with each other. In this case, the controller 111 reads the information on the optical disk manufacturing company from the system lead-in area, and the controller 111 obtains the initial value corresponding to the optical disk manufacturing company from the built-in memory to set the initial value of the reproduction laser power.

Alternatively, as shown in FIG. 3B, an adjustment factor α for adjusting the optimum reproduction laser power recorded in the system lead-in area may be stored in the built-in memory while correlated with the optical disk manufacturing company. In this case, the controller 111 reads the information on the optimum reproduction laser power and optical disk manufacturing company which are recorded in the system lead-in area, the controller 111 obtains the adjustment factor α corresponding to the read optical disk manufacturing company from the built-in memory, and the controller 111 computes the initial laser power in trial write by multiplying the optimum reproduction laser power read from the system lead-in area by the obtained adjustment factor α.

Sometimes the optical disk manufacturing company obtained from the system lead-in area does not exist in the built-in memory. Therefore, as shown in FIGS. 3A and 3B, the initial value of the reproduction laser power or a default value of the adjustment factor α is stored in the built-in memory. In the case where the optical disk manufacturing company obtained from the system lead-in area does not exist in the built-in memory, the controller 111 sets the initial value of the reproduction laser power using the initial value or the default value of the adjustment factor α, which is stored in the built-in memory.

In the initial value or factor α stored in the built-in memory, the initial value of the reproduction laser power is set so as to become smaller than the optimum reproduction laser power recorded in the system lead-in area by several tens percent. Accordingly, a reproduction operation initially tested to the optical disk is performed with a laser power which is suppressed lower than the optimum reproduction laser power set by the optical disk manufacturing company.

In FIGS. 3A and 3B, the initial value and the adjustment factor are set in each optical disk manufacturing company. Alternatively, only one kind of the initial value and one kind of the adjustment factor may be stored in the built-in memory and set as the initial value of the reproduction laser power. In this case, in only one kind of the initial value and one kind of the adjustment factor, it is necessary that the initial value of the reproduction laser power be set to a value smaller than the optimum reproduction laser power recorded in the system lead-in area of the optical disk with respect to any optical disk existing in the current market.

Figure 4:
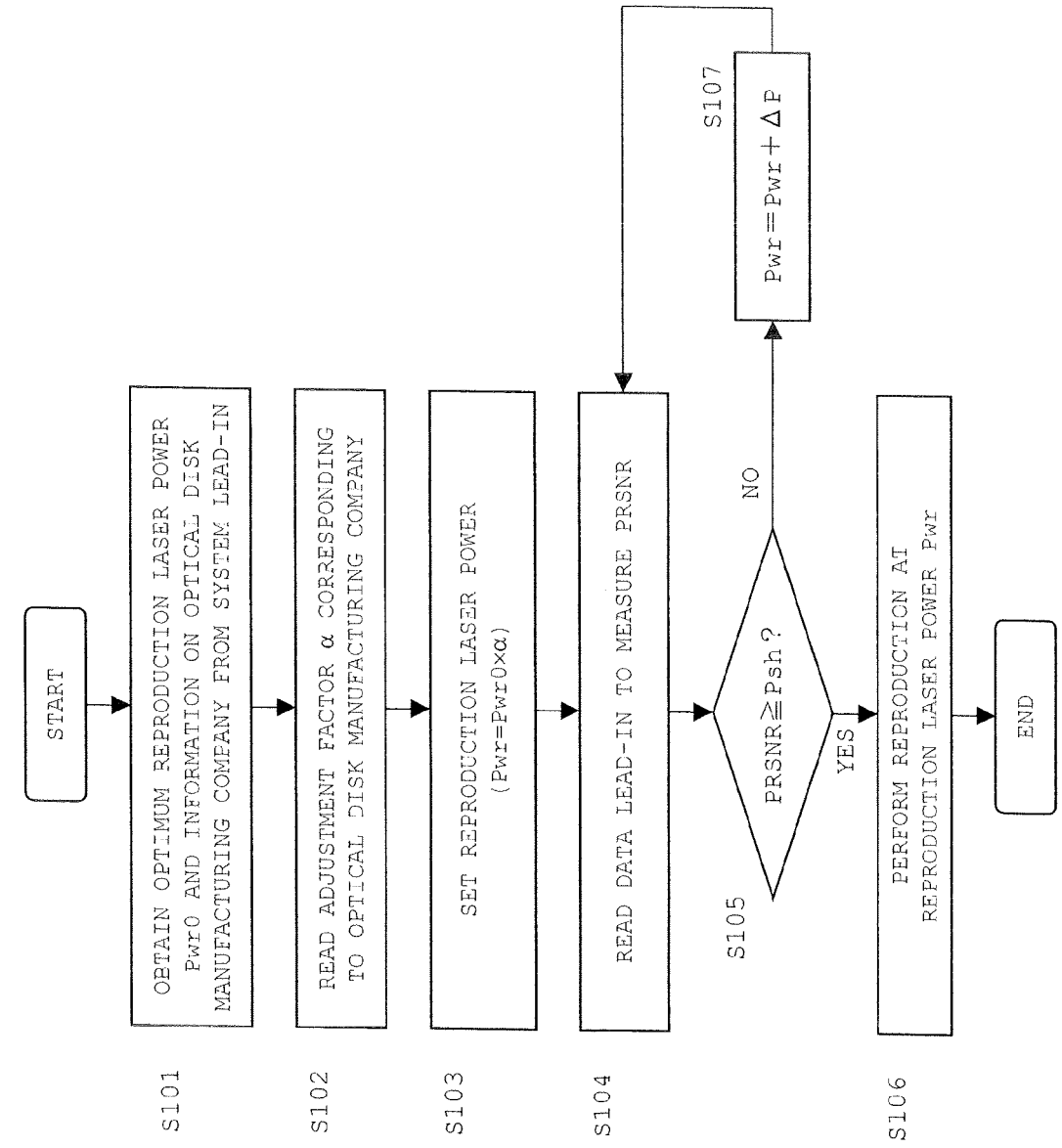
FIG. 4 is a process flowchart in setting a reproduction laser power according to an embodiment.

FIG. 4 is a process flowchart in setting the reproduction laser power. The process flowchart of FIG. 4 is used in the case where the initial value of the reproduction laser power is set using the adjustment factor shown in FIG. 3B. In the case where the method in which the table shown in FIG. 3A is used or other methods described above are adopted as the initial value setting method, S101 to S103 of FIG. 4 are appropriately changed according to the adopted method, When a process of setting the reproduction laser power is started, an optimum reproduction laser power Pwr0 and identification information on the optical disk manufacturing company are obtained from the system lead-in area of the optical disk which is of a reproduction target (S101). At this point, the laser power used in reading the pieces of information from the system lead-in area may be set to a general reproduction laser power, or the laser power may be set to a value of a minimum laser power defined by standards or to the laser power lower than the minimum laser power within a range in which the information can be read. Although not used in the present embodiment, information may simultaneously be real from BCA to meet the needs of the apparatus.

After the optimum reproduction laser power Pwr0 and the identification information on the optical disk manufacturing company are obtained from the system lead-in area, the adjustment factor α corresponding to the optical disk manufacturing company of the optical disk is read from the built-in memory (S102), and the optimum reproduction laser power Pwr0 obtained from the system lead-in area is multiplied by the adjustment factor α to set the initial value of a reproduction laser power Pwr (S103).

When the initial value of the reproduction laser power Pwr is set, the optical pickup 105 is moved to the data lead-in area. The data lead-in area is read at the reproduction laser power Pwr set in S103, and PRSNR (Partial Response Signal to Noise Ratio) is measured from a reproduction signal obtained at that time (S104). The measured PRSNR is compared to a threshold Psh (S105). When PRSNR is not lower than the threshold Psh (YES in S105), the reproduction laser power Pwr (initial value) set in S103 is set to the reproduction laser power during the reproduction operation (S106).

On the other hand, when PRSNR measured in D104 is lower than the threshold Psh (NO in S105), the reproduction laser power Pwr is increased by ΔP (S107), and the flow returns to S104. Then, PRSNR is measured again. The processes of S104 and S105 are repeated until PRSNR is not lower than the threshold Psh (YES in S105). The reproduction laser power Pwr obtained at the time PRSNR is not lower than the threshold Psh is set to the reproduction laser power during the reproduction operation (S106).

In S105, the threshold Psh is set more than 15. This is because, in the case where PRSNR is not more than 15, an error is frequently generated in reproduction data and error correction becomes beyond control of a signal processing system. Practically, the threshold Psh is preferably set slightly higher than 15 in consideration of a variation in signal characteristic in the entire surface of the optical disk and system safety.

According to the embodiment, the reproduction laser power is set lower than the optimum reproduction laser power set in the optical disk within the range in which the reproduction laser power does not interrupt the reproduction operation. Therefore, while the reproduction operation is smoothly performed, the recording layer deterioration caused by the irradiation with the reproduction laser beam can be suppressed and the reproduction durability of the optical disk and the reliability of the recording information can be enhanced.

Figure 5:
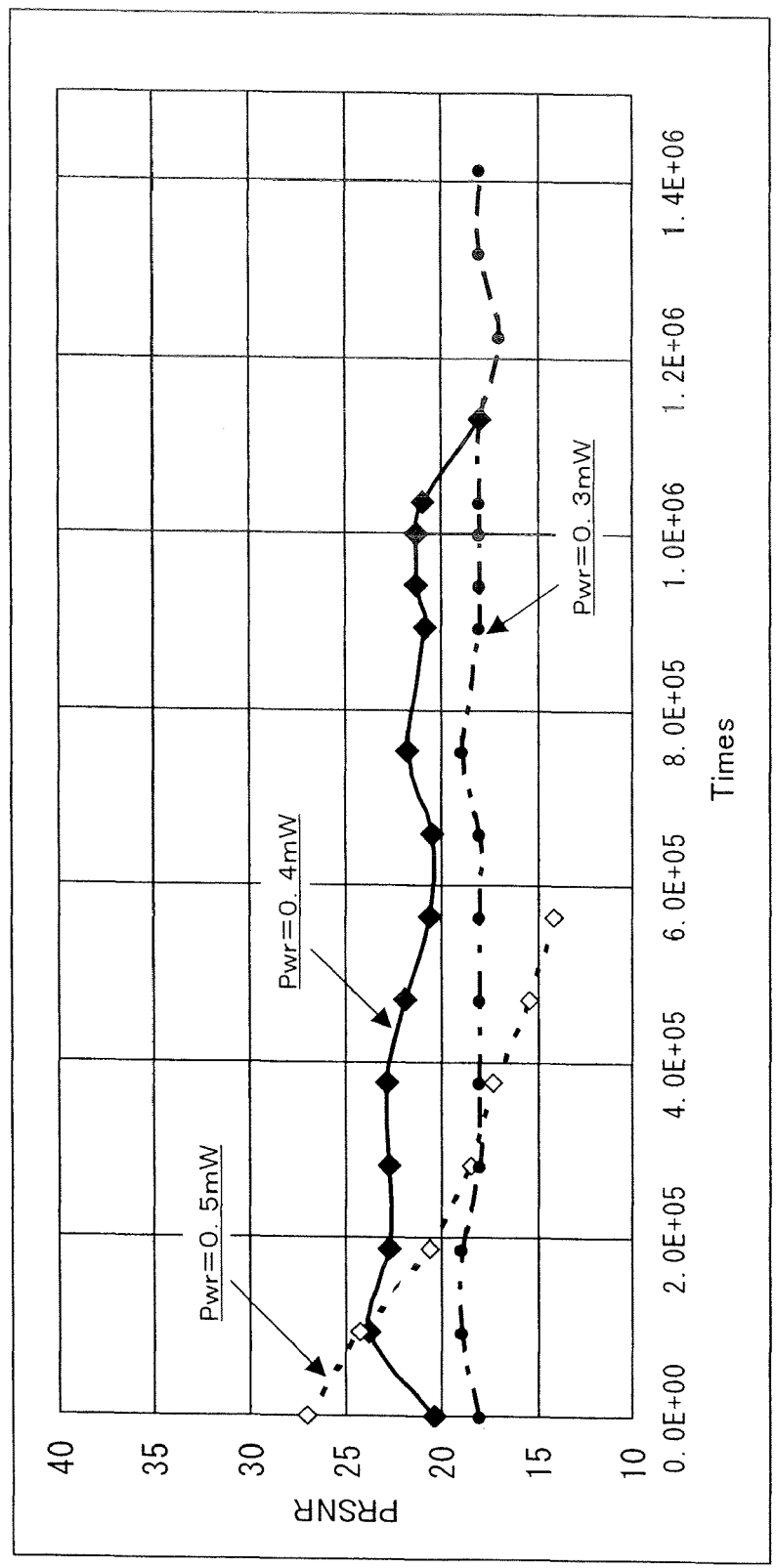
FIG. 5 shows a verification example according to an embodiment.

FIG. 5 shows a verification result of the reproduction durability of the optical disk.

Figure 6A:
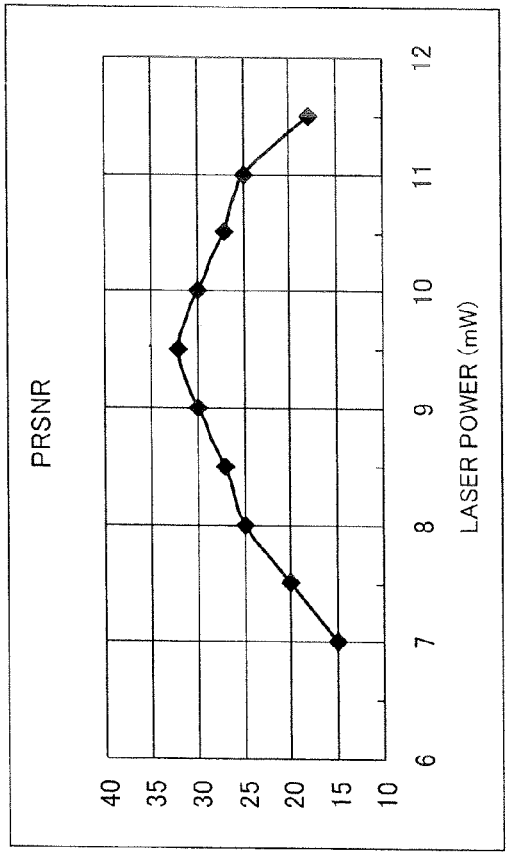
FIGS. 6A and 6B are views explaining a characteristic of a sample disk used in the verification and a recording laser power setting method.

A sample disk (Low-to-High type HD DVD-R disk) having a characteristic shown in FIG. 6A was used in the verification. FIG. 6A shows a measurement result in which the recording is performed in a track (groove) located on the sample disk and then the track is reproduced to measure PRSNR. In FIG. 6A, a horizontal axis indicates the recording laser power and a vertical axis indicates PRSNR. In the measurement, the recording was performed by irradiating the track with the laser beam at a recording laser power of a measurement target. ODU-1000 produced by Pulstec Industrial Co., Ltd. was used as a measuring machine. During the measurement, a disk linear velocity was set to 6.61 m/s (groove), and the reproduction laser power was set to 0.4 mW.

The recording was performed to the sample disk not at the laser power of 9.5 mW at which PRSNR becomes the maximum but at the laser power of 8.5 mW. This is because the recording layer deterioration caused by the irradiation with the recording laser beam is suppressed. The recording laser power (8.5 mW) used at that time was based on a measurement result of FIG. 6B.

Figure 6B:
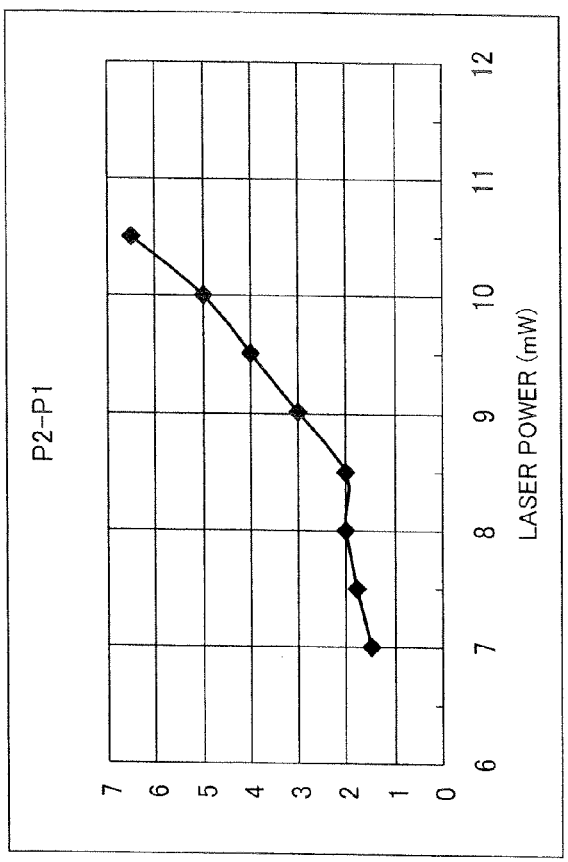

FIG. 6B shows the measurement result of a difference between PRSNR (P2) and PRSNR (P1). The difference between PRSNR (P2) and PRSNR (P1) is determined as follows: The recording is performed in a track (groove) T1 at a certain recording laser power Pwt, and the recording is performed in a next track T2 adjacent to a track T1 at the same laser power Pwt. Then, PRSNR (P2) is determined by reproducing the recorded portion in a track T2, PRSNR (P1) is determined by reproducing the recorded portion in the track T1, and a difference between PRSNR (P2) and PRSNR (P1) is determined. In FIG. 6B, a horizontal axis indicates the recording laser power Pwt and a vertical axis indicates the difference between P2 and P1. The measurement was performed while the recorded portion of the track T1 and the recorded portion of the track T2 stood substantially completely in a double line in an optical disk radial direction. The measuring machine and measuring conditions used in FIG. 6B were the same as those of FIG. 6A.

In the measurement, the laser beam leaked into the already-recorded portion of the track T1 when the recording was performed in the track T2, a deterioration of the signal characteristic is generated by a leakage of the laser beam into the recorded portion of the track T1. At this point, a degree of deterioration can be evaluated by the difference between P2 and P1. In the measurement result of FIG. 6B, the difference between P2 and P1 is rapidly increased around a portion in which the recording laser power exceeds 8.5 mW. Accordingly, when the recording laser power is larger than 8.5 mW, the signal deterioration becomes remarkable in the already-recorded track, and it can be predicted that the reproduction durability of the optical disk is decreased. That is, it can be predicted that the recording layer is deteriorated to lower the reproduction durability of the optical disk when the recording laser power is set at about 9.5 mW where PRSNR becomes the beast.

Because of the above prediction, in the verification, the recording was performed into the sample disk while the laser power used in the recording was set to 8.5 mW lower than the laser power of 9.5 mW at which PRSNR became the maximum. The change in PRSNR was measured by repeating the reproduction to the already-recorded sample disk at three reproduction laser powers of 0.5 mW, 0.4 mW, and 0.3 mW. FIG. 5 shows the measurement result. The reproduction laser power of 0.4 mW is the optimum reproduction laser power obtained from the system lead-in area of the sample disk. In FIG. 5, a horizontal axis indicates the number of reproduction times and a vertical axis indicates PRSNR.

In the verification of FIG. 5, the recording was sequentially performed from a disk inner circumference at the recording laser power of 8.5 mW, and the two adjacent tracks which were in the recorded state were selected and repeatedly reproduced at the three reproduction laser powers of 0.5 mW, 0.4 mW, and 0.3 mW. ODU-1000 produced by Pulstec Industrial Co., Ltd. was used as the measuring machine. During the measurement, the disk linear velocity was set to 6.61 m/s (constant).

As can be seen from FIG. 5, in the case where the reproduction laser power is set to 0.5 mW (exceeding the optimum reproduction laser power of 0.4 mW by 0.1 mW), PRSNR is rapidly decreased immediately after the measurement is started, and PRSNR is lower than a lower limit setting value (PRSNR=15) when the number of reproduction times is lower than about 500000. On the other hand, when the reproduction laser power is set to 0.4 mW (the optimum laser power obtained from the system lead-in), PRSNR can be maintained at values not lower than 20 until the number of reproduction times reaches 1000000. Therefore, the repeated reproduction times of 1000000 which are demanded in the standard can be realized. In the case where the reproduction laser power is set to 0.3 mW (decreased by 0.1 mW from the optimum reproduction laser power of 0.4 mW), PRSNR can be maintained at a value of about 18 until the number of reproduction times reaches 1000000. Therefore, the repeated reproduction times of 1000000 which are demanded in the standard can be realized. Furthermore, in the reproduction laser power of 0.3 mW, when the number of reproduction times exceeds 1000000, PRSNR of the reproduction signal becomes better compared with the reproduction laser power of 0.4 mW, and it is confirmed that the optical disk can withstand the reproduction times of about 1500000.

As can be seen from the verification, in the embodiment, the reproduction laser power is suppressed to levels lower than the optimum reproduction laser power obtained from the system lead-in area of the optical disk. Therefore, while the smooth reproduction operation is maintained, the recording layer deterioration caused by the irradiation with the reproduction laser beam can effectively be suppressed, and the reproduction durability of the optical disk and the reliability of the recording information can be enhanced. According to the verification of FIG. 5, the reproduction durability of the optical disk can significantly be lengthened compared with the case in which the reproduction laser power is set to the optimum reproduction laser power obtained from the system lead-in.

In the verification of FIG. 5, as described in FIG. 6, the recording laser power is also set in consideration of the reproduction durability. However, according to the embodiment, even if the recording laser power is not set in consideration of the reproduction durability, the reproduction durability of the optical disk can be brought close to the number of times demanded in the standard (reproduction times of 1000000).

Sometimes the laser power of the reproduction laser beam with which the optical disk is irradiated is shifted by about 10 percent with respect to the setting value of the semiconductor laser due to a variation in optical pickup and a temperature change. Therefore, even if the optimum reproduction laser power obtained from the system lead-in is set as the reproduction laser power to the optical disk, the optical disk is possibly irradiated with the laser beam having the laser power larger than the set laser power. For example, in the case where the optimum reproduction laser power of 0.4 mW is described in the system lead-in, even if the optimum reproduction laser power of 0.4 mW is directly set as the reproduction laser power, sometimes the actual output becomes 0.44 mW. In such cases, the optical disk is irradiated with the reproduction laser beam having the excess laser power, which results in a risk of deteriorating the recording layer.

According to the invention, even in such cases, while the laser power is gradually increased from the initial value lower than the optimum reproduction laser power obtained from the system lead-in, the laser power is set as the reproduction laser power to the optical disk at the time PRSNR is not lower than the threshold Psh, which allows the optical disk to be prevented from being irradiated with the excess laser beam. Therefore, the reproduction durability of the optical disk can also be enhanced from this viewpoint.

Although the embodiment according to the invention is described above, the invention is not limited to the above embodiment.

In the embodiment, the reproduction laser power Pwr is increased until PRSNR is not lower than the threshold Psh in the process flowchart of FIG. 4, (S104, S105, and S107). However, when the process flow is repeated, sometimes the reproduction laser power Pwr satisfying the condition that PRSNR is not lower than the threshold Psh is larger than the optimum reproduction laser power Pwr0 obtained from the system lead-in, whereby the optical disk is possibly irradiated with the reproduction laser beam having the laser power higher than the optimum reproduction laser power Pwr0.

Figure 7:
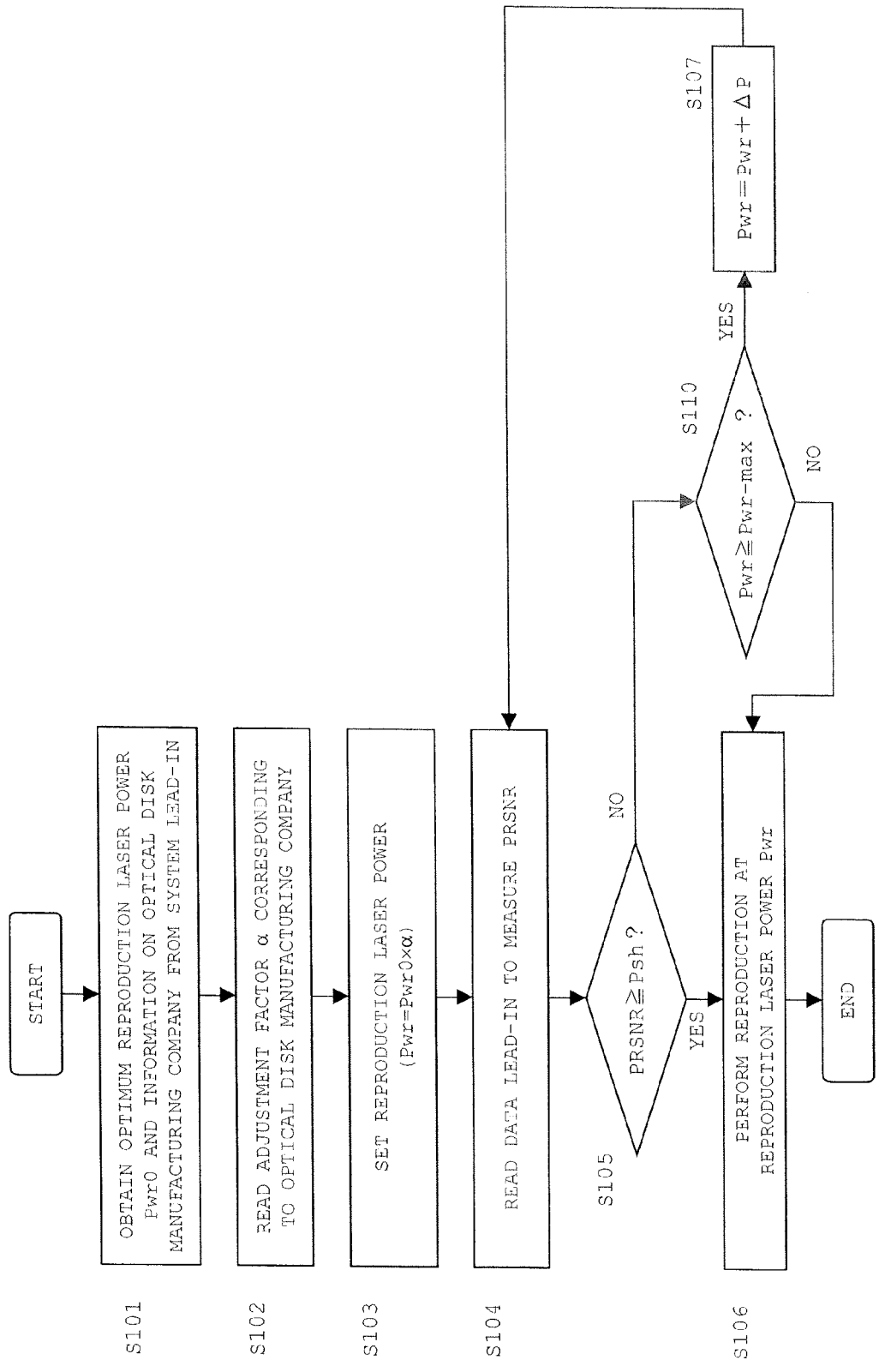
FIG. 7 shows a modification of the process flowchart in setting the reproduction laser power according to the embodiment.
Figure 8A:
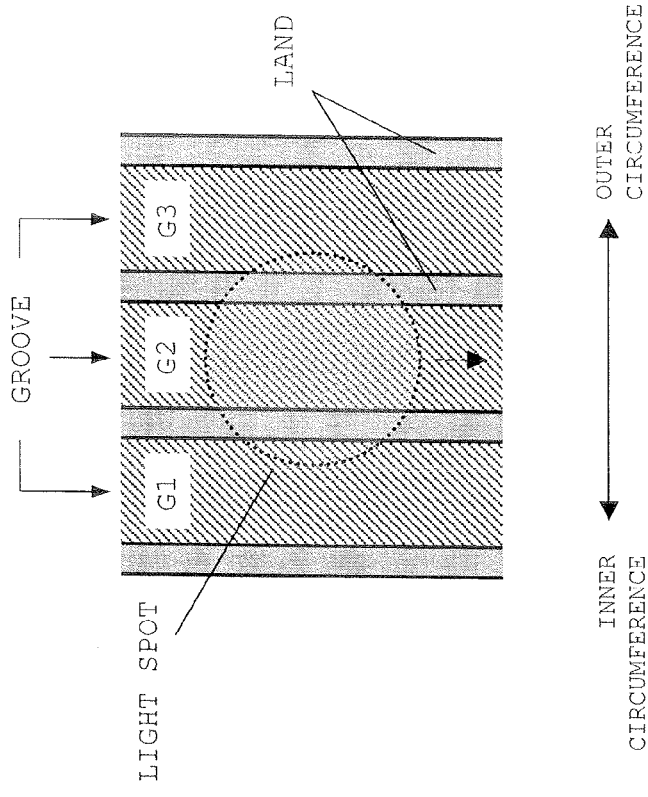
FIGS. 8A and 8B are views explaining recording and reproduction operations performed to a Low-to-High type HD DVD-R.
Figure 8B:
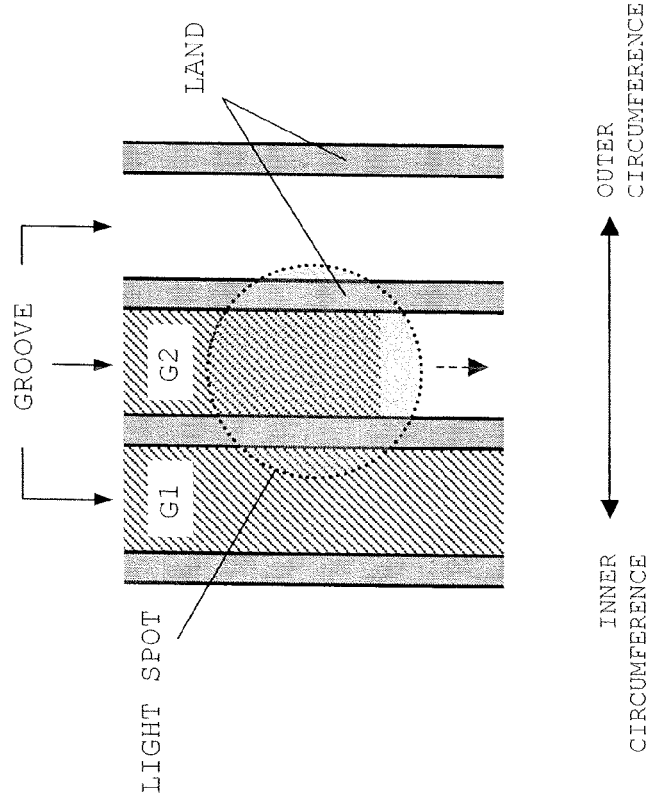

In order to avoid the trouble, as shown in FIG. 7, it is necessary that S110 be added to set the reproduction laser power Pwr within a range where the reproduction laser power Pwr does not exceed an upper limit value Pwr-max. In this case, when the upper limit value Pwr-max is set to the optimum reproduction laser power Pwr0 obtained from the system lead-in of the optical disk, the reproduction laser power Pwr to the optical disk can be prevented from exceeding the optimum reproduction laser power Pwr0.

In the above embodiment, PRSNR is used as the parameter value concerning the quality of the reproduction signal. Alternatively, a reproduction error rate, CN, a jitter value may be used as the parameter value.

Although an HD DVD is cited as an example in the above embodiment, the invention can be applied to not only the HD DVD but also an optical disk apparatus in conformity with a Blue-ray standard.

It should be understood that various change and modifications can appropriately be made without departing from the scope of the technical thought shown in the appended claims.

What is claimed is:

1. An optical disk apparatus comprising:
   an optical pickup which irradiates an optical disk with a laser beam;
   an optimum reproduction laser power obtaining unit which obtains an optimum reproduction laser power based on information on the optimum reproduction laser power reproduced from the optical disk;
   an initial laser power setting unit which sets a laser power lower than the optimum reproduction laser power as an initial value;
   a laser power adjusting unit which increases the reproduction laser power from the initial value while performing trial reproduction until a quality level of the reproduction signal is not lower than a reference level; and
   a reproduction laser power setting unit which sets the reproduction laser power at a time the quality level is not lower than the reference level as the reproduction laser power to reproduce the optical disk.

2. The optical disk apparatus according to claim 1, wherein the initial laser power setting unit determines the initial value by multiplying the optimum reproduction laser power obtained based on the information on the optimum reproduction laser bower reproduced from the optical disk by an adjustment factor lower than one.

3. The optical disk apparatus according to claim 1, wherein the initial laser power setting unit includes a table and an information obtaining unit, information on an optical disk manufacturing company and information on the initial value being correlated with each other in the table, the information obtaining unit obtaining the information on the optical disk manufacturing company from the optical disk, the initial laser power setting unit obtains the information on the optical disk manufacturing company from the optical disk, reads the information on the initial value corresponding to the obtained optical disk manufacturing company, and then sets the initial value based on the read information.

4. The optical disk apparatus according to claim 3, wherein the information on the initial value is an adjustment factor lower than one, and the initial laser power setting unit determines the initial value by multiplying the optimum reproduction laser power obtained from the optical disk by the adjustment factor corresponding to the optical disk manufacturing company.

5. The optical disk apparatus according to claim 1, wherein the laser power adjusting unit increases the reproduction laser power within a range from the initial value to a predetermined upper limit of the reproduction laser power.

6. The optical disk apparatus according to claim 5, wherein the upper limit of the reproduction laser power is set to the optimum reproduction laser power obtained based on the information on the optimum reproduction laser power reproduced from the optical disk.

* * * * *